United States Patent
McLaughlin et al.

(10) Patent No.: US 6,785,382 B2
(45) Date of Patent: Aug. 31, 2004

(54) SYSTEM AND METHOD FOR CONTROLLING A FILTER TO ENHANCE SPEAKERPHONE PERFORMANCE

(75) Inventors: Hugh J. McLaughlin, Mountain View, CA (US); Tamara L. Logan, Los Altos, CA (US); Jeff L. Schenck, San Jose, CA (US)

(73) Assignee: Signalworks, Inc., Mountain View, CA (US)

( * ) Notice: Subject to any disclaimer, the term of this patent is extended or adjusted under 35 U.S.C. 154(b) by 0 days.

(21) Appl. No.: 10/044,658

(22) Filed: Jan. 8, 2002

(65) Prior Publication Data

US 2002/0154761 A1 Oct. 24, 2002

Related U.S. Application Data

(60) Provisional application No. 60/268,238, filed on Feb. 12, 2001.

(51) Int. Cl.[7] .............................................. H04M 9/00
(52) U.S. Cl. ............................ 379/388.01; 379/388.02; 379/399
(58) Field of Search ...................... 379/388.01, 388.02, 379/389

(56) References Cited

U.S. PATENT DOCUMENTS

| | | |
|---|---|---|
| 4,912,758 A | 3/1990 | Arbel .......................... 379/388 |
| 5,365,583 A | 11/1994 | Huang et al. ................ 379/390 |
| 5,479,502 A | * 12/1995 | Ohga et al. |
| 5,515,432 A | 5/1996 | Rasmusson |
| 5,526,419 A | 6/1996 | Allen et al. .................. 379/387 |
| 5,548,642 A | 8/1996 | Diethorn ...................... 379/410 |
| 5,553,014 A | 9/1996 | De Leon, II et al. ... 364/724.19 |
| 5,598,468 A | * 1/1997 | Amitcht et al. |
| 5,636,272 A | * 6/1997 | Rasmusson |
| 5,790,671 A | 8/1998 | Cooper |
| 6,263,078 B1 | 7/2001 | McLaughlin et al. |
| 6,434,110 B1 | * 8/2002 | Hemkumar |

* cited by examiner

*Primary Examiner*—F. W. Isen
*Assistant Examiner*—Ramnandan Singh
(74) *Attorney, Agent, or Firm*—Marger Johnson & McCollom, P.C.

(57) ABSTRACT

In a speakerphone system, the signal that is directed to a loudspeaker is filtered by a dynamically controllable highpass filter. The filter characteristics are adjusted on the basis of the power of the signal and the degree of recent microphone activity. The filtered signal is a far-talker signal, while the microphone activity is represented as a near-talker signal that includes an echo component as a consequence of loudspeaker-to-microphone coupling. The degree of microphone activity is determined by a subband analyzer. A noise floor estimator may be used to determine the degree to which the near-talker signal is comprised of background noise, so that the noise can be eliminated in the process of controlling the highpass filter.

20 Claims, 9 Drawing Sheets

SYSTEM AND METHOD FOR CONTROLLING A FILTER TO ENHANCE SPEAKERPHONE PERFORMANCE

This application claims the benefit of U.S. Provisional Application No. 60/268,238, filed Feb. 12, 2001.

TECHNICAL FIELD

The invention relates generally to signal processing in a hands-free loudspeaking system, referred to herein as a "speakerphone."

BACKGROUND ART

The performance of a speakerphone is judged by its ability to approach the full-duplex ideal. An ideal full-duplex speakerphone allows parties at opposite ends of a telephone connection to talk simultaneously without significant modification to either the far-end signal or the near-end signal. At the same time, no audible echo should be allowed.

Figure 1:
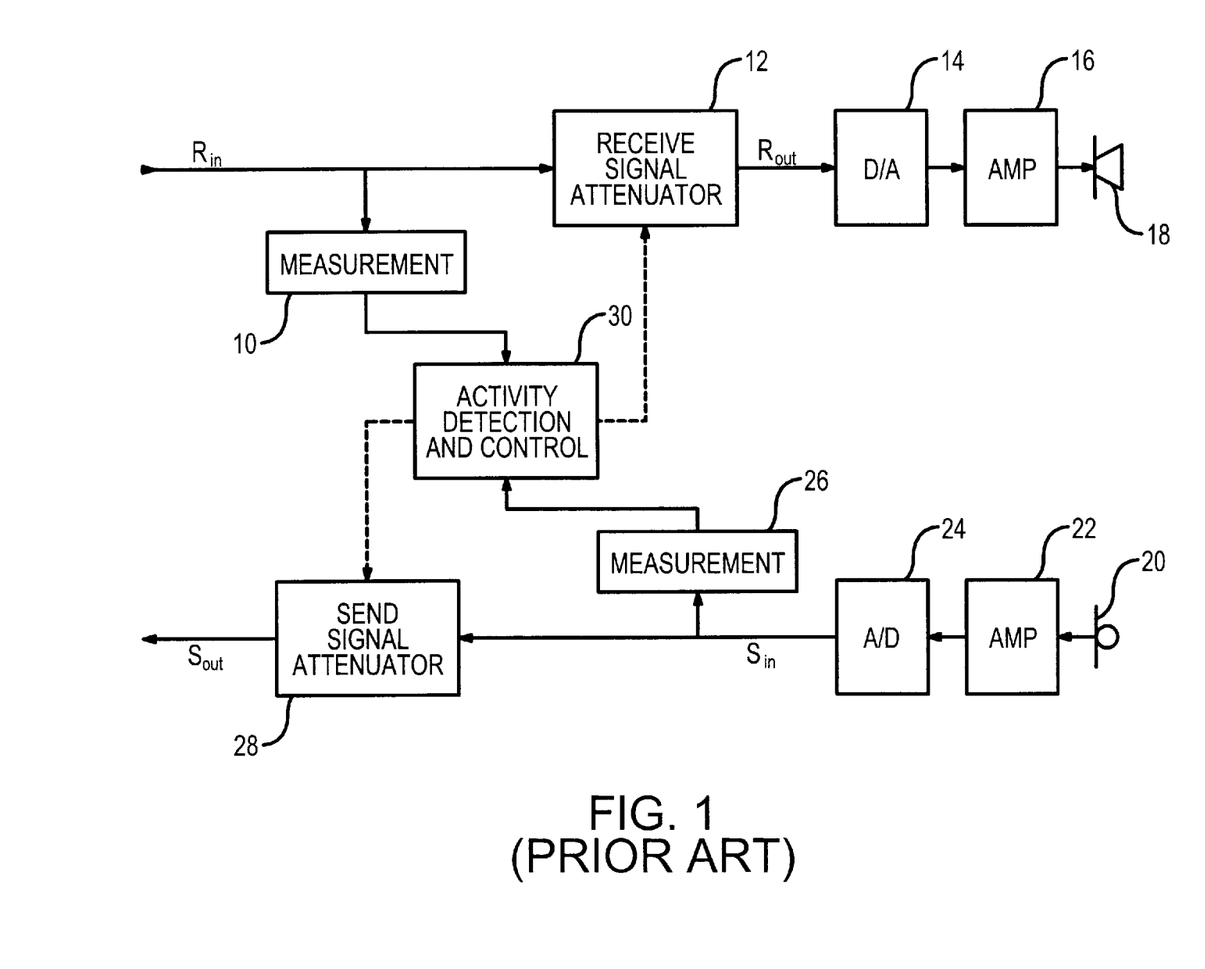
FIG. 1 is a block diagram of a conventional echo suppressing speakerphone system.
Figure 2:
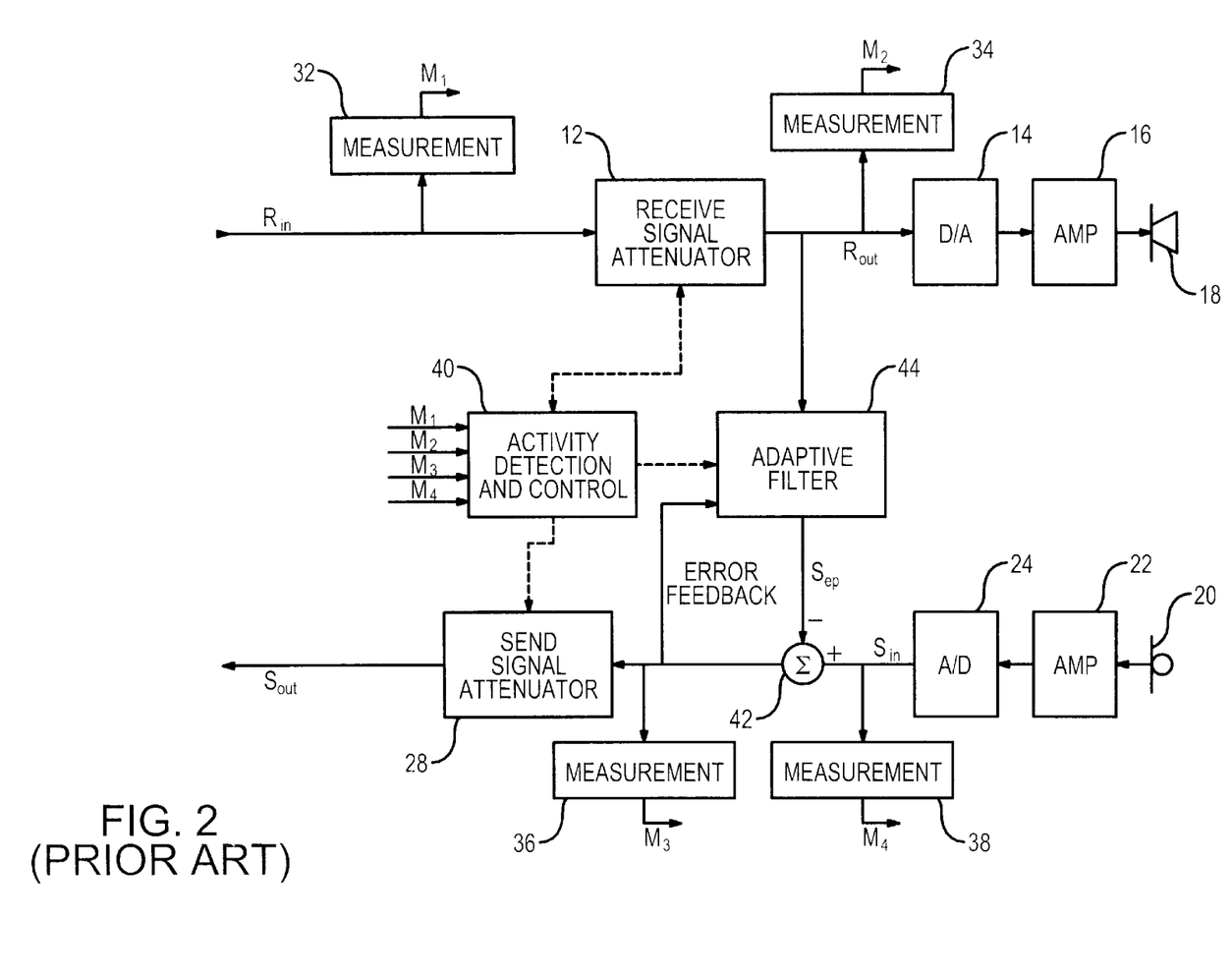
FIG. 2 is a block diagram of a conventional echo cancellation speakerphone system having echo suppression.

Echo is caused by the coupling of loudspeaker sound into a microphone transducer. Echo can be controlled by either suppression or cancellation. FIG. 1 shows a typical structure of an acoustic echo suppression system, while FIG. 2 shows an acoustic echo cancellation system with supplemental echo suppression. Acoustic echo suppression requires that either or both of the received path (received far-end signal $R_{in}$) or the send path (send near-end signal $S_{out}$) be attenuated to a sufficiently low degree so that no echo is perceived. On the other hand, acoustic echo cancellation uses a linear model to predict the acoustic echo signal, so that the prediction may be used to remove the echo signal component.

In the echo suppression system of FIG. 1, the received far-end signal $R_{in}$ is directed to a first measurement component 10 and a received signal attenuator 12. The output $R_{out}$ of the attenuator passes through a digital-to-analog converter 14 and an amplifier 16 to a speaker 18 that projects the sound. When the near-end talker is speaking, the voice information is converted to an electrical signal by a microphone 20. The signal passes through an amplifier 22 and an analog-to-digital converter 24. In addition to the desired voice information within the signal $S_{in}$, there may be undesired acoustic echo information. The $S_{in}$ signal is directed to both a second measurement component 26 and a send signal attenuator 28. The signal $S_{out}$ that is the output of the attenuator 28 is the signal which is transmitted to the far-end party of the telephone call. As shown in FIG. 1, the measurements of the measurement components 10 and 26 are received at an activity detection and control component 30. It is this component that utilizes the measurements to generate separate control signals (shown as dashed connections) for the two attenuators 12 and 28. In the echo cancellation system of FIG. 1, cancellation occurs along both the receive path and the send path.

Referring now to the cancellation/suppression system of FIG. 2, many of the components are duplicated from FIG. 1. As noted, acoustic echo cancellation uses a linear model to predict the acoustic echo signal. Echo cancellation requires a reference signal that consists of the signal $R_{out}$ to the speaker 18. In total, four measurement components 32, 34, 36 and 38 are employed, with each measurement being directed to an activity detection and control component 40. Using the different components, the reference signal is convolved using a linear acoustic echo model to produce an echo prediction signal $S_{ep}$ that is subtracted from the microphone signal $S_{in}$ at a summing device 42 in order to cancel echo. In principle, the acoustic echo model can be accurately determined using an adaptive filter 44, wherein the loudspeaker signal $R_{out}$ is the reference signal and the echo-cancelled signal from the summing device 42 is used as error feedback to drive the adaptation of the adaptive filter.

The difficult task with all full-duplex speakerphones is that it is necessary to determine how much of the echo-cancelled signal is composed of residual echo and how much is valid near-end talker energy. If this composition is known, effective activity decisions can be determined. If there is substantial residual echo and little near-end talker energy, the adaptive filter 44 of FIG. 2 should be enabled to rapidly adapt its coefficients. Conversely, if there is substantial near-end talker energy, the coefficient adaptation process should be disabled, because the near-end talker interference may cause divergence of the adaptive filter. In addition, only a minimal amount of suppression should be applied in such a situation, so that echo is not audible. Echo will be audible if it is of sufficient level that the echo cannot be masked by either background noise or by the valid near-talker signal. When echo is audible, suppression is required to eliminate the echo. Thus, the system of FIG. 2 includes the attenuators 12 and 28 that provide echo suppression in addition to the system's echo cancellation. However, in practice, differentiating between residual echo and valid near-end talker energy is problematic.

The process of estimating the composition of the echo-cancelled signal into residual echo and valid near-talker components is important to maximizing full-duplex speakerphone performance. With accurate knowledge of the composition, the adaptation processing can be optimized, and full-duplex conversation with minimal suppression is possible, even if the residual echo is substantial.

There is known prior art in the field of adaptive echo cancellation in the area of estimating the composition of the echo-cancelled signal. Conventionally, several measurements are made in determining the composition of the echo-cancelled signal. As shown in FIG. 2, there are four measurement components 32, 34, 36 and 38. Measurements may consist of a sophisticated spectrum analysis or may be made by a related use of a correlation analysis between the signals at the measurement points.

There is also known prior art in the field of managing the signal level and signal spectrum to improve performance in utilizing loudspeakers to enhance intelligibility, to minimize the power required by the loudspeaker, to control the signal level so as to prevent the loudspeaker from being overdriven, and to modify the spectrum based on the signal power in order to make the signal appear more natural to human ears. U.S. Pat. No. 5,515,432 to Rasmusson, U.S. Pat. No. 5,636,272 to Rasmusson, U.S. Pat. No. 5,790,671 to Copper, and U.S. Pat. No. 5,907,823 to Sjöberg et al. relate to enhancing the intelligibility of the loudspeaker sound, while controlling the required power and preventing the loudspeakers from being overdriven. Historically, the intelligible signal of human speech is carried primarily by frequencies above approximately 1000 Hz, while approximately ninety percent of normal speech power is in the frequencies below 1000 Hz. Innovations in the art are often centered on the means for enhancing performance, given these facts.

It is also known that humans perceive loudness of signals differently, depending on the pitch of signals. Thus, when music is played at a low volume, the low-frequency voices and instruments are perceived by humans as being more "natural" if they are amplified to a greater extent than the high-frequency voices and instruments. Consequently, many audio systems have a manual control to enable a filter to boost the low frequencies. As the music is increased in volume, the low frequencies seem unnaturally strong. In this case, the low frequencies can be played at normal level or may even be suppressed. Thus, a system may gradually use a loudness filter characteristic on the basis of either (1) the volume level selection or (2) the measured signal level. The above-identified patent to Cooper controls the filter properties based on a combination of the volume control selection and the measured ambient noise level. When high ambient noise is present, the relative gain of the higher audio frequencies is increased at the expense of low frequency response. Thus, a degree of "naturalness" is traded for the higher intelligibility provided by increased high frequency gain.

SUMMARY OF THE INVENTION

The performance of a speakerphone system is enhanced by dynamically filtering a received far-talker signal in a manner which is preferential to passing high audio frequencies and adjustable with regard to passing audio frequencies within a low frequency band. Filtering characteristics for attenuating low frequency components of the far-talker signal are based upon controlling a level of echo within a near-talker signal. Activity at a remote site from which the far-talker signal is generated and activity at the local site from which a near-talker signal is generated are both considered in determining the filter characteristics. In one embodiment, the filter characteristics are adjusted by varying a cutoff frequency along the low audio frequency band, with a tendency toward a higher cutoff frequency as one or both of far-talker activity and near-talker activity increase.

The far-talker signal is received along an input signal path that extends to a first transducer (e.g., a loudspeaker) of the speakerphone system. The input signal path includes a dynamic highpass filter having generally flat filter characteristics for high frequency components and having the dynamic filter characteristics for the low frequency components. Optionally, the signal path may include a signal attenuator.

The dynamic highpass filter functions as a first echo controller by manipulating the far-talker signal to reduce the likelihood that the audible output of the first transducer will be coupled to a second transducer (e.g., a microphone) which is used to generate a near-talker signal for transmission to the remote site at which the far-talker signal was generated. The output signal path from the second transducer includes a second echo controller, which may provide conventional echo suppression, conventional echo cancellation, or both.

A near-talker subband analyzer has inputs from both the input and output signal paths. The analyzer is configured to compare the current strengths (i.e., presently measured powers) for each of a number of different audio frequency subbands. Based upon the comparisons, the analyzer calculates a prediction of the level of echo within the near-talker signal. The output of the analyzer may be indicative of the prediction of the echo level, but could be indicative of the valid near-talker level, since the two levels may be considered to be inverses of each other.

A filter control algorithm component receives the prediction from the near-talker subband analyzer and receives a recent power measurement of the far-talker signal. Based upon these two inputs, the filter control algorithm component selects the filter characteristics for the dynamic highpass filter. In one embodiment, as the power of the far-talker signal increases, a cutoff frequency of the filter is increased, with the cutoff frequency being manipulated in the range of 20 Hz to 1000 Hz and being defined as the point at which filter attenuation is 3 dB relative to the flat portion of the frequency response at the upper audio frequencies. However, other embodiments are contemplated. This tendency to increase the cutoff frequency with an increase in far-talker signal power reduces the strengths of the low frequency components, which are more likely to induce loudspeaker-to-microphone coupling (i.e., echo). Similarly, the cutoff frequency tends to increase with detected increases in valid near-talker activity. In order to more accurately determine valid near-talker activity, the system may include a noise floor estimator that is designed to differentiate true activity from recurring background noise, so that the noise component may be disregarded.

An advantage of the invention is that the low frequency components of the far-talker signal are dynamically controlled to reduce echo power within the near-talker signal. Another advantage is that the system reduces the likelihood that the loudspeaker will be driven into its low-volume, non-linear region. Less power is required to produce an intelligible signal. Moreover, the invention reduces the difficulty in distinguishing valid near-talker activity from echo.

DETAILED DESCRIPTION

Figure 3:
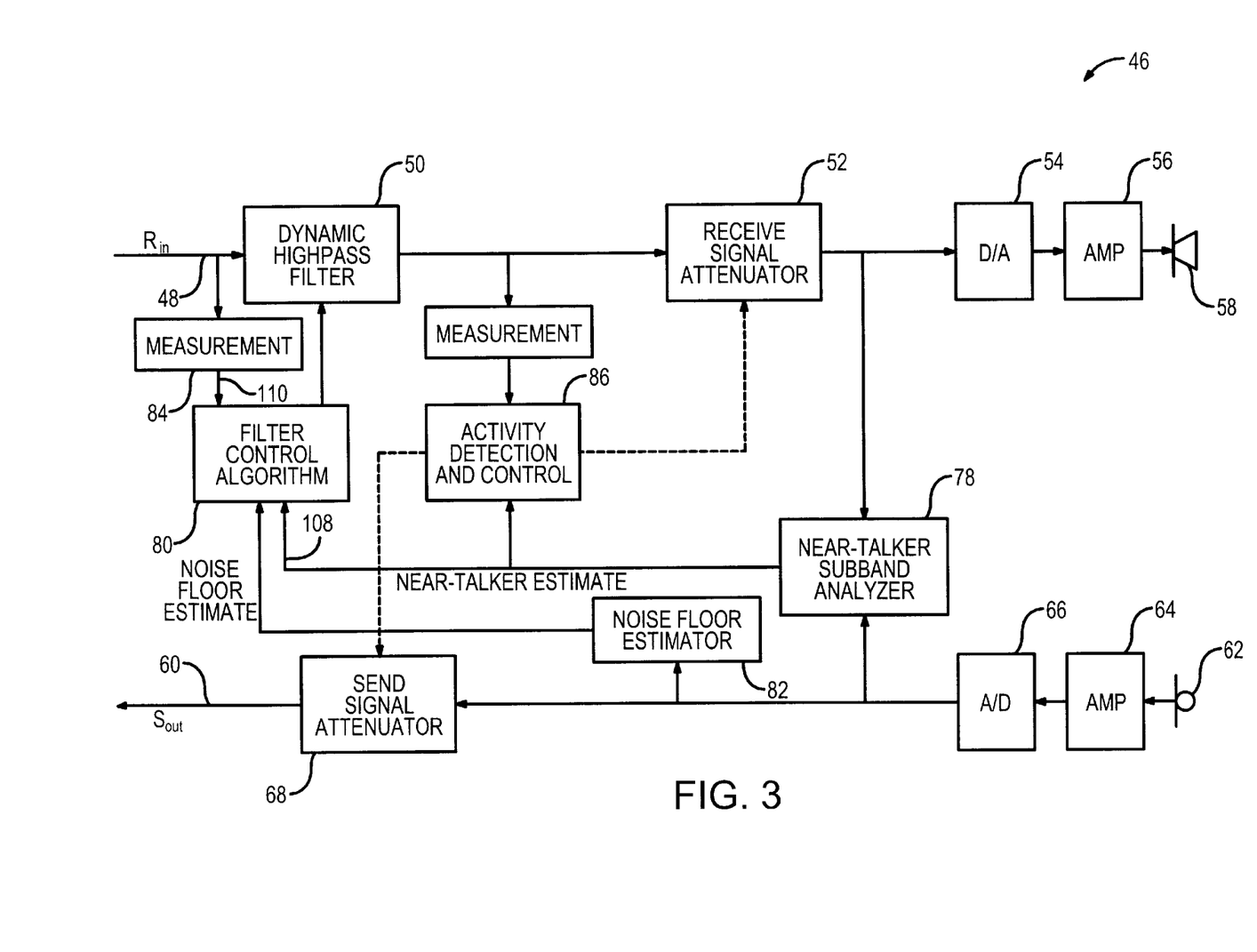
FIG. 3 is a block diagram of an echo suppressing speaker phone having dynamic highpass filtering in accordance with one embodiment of the invention.

With reference to FIG. 3, a speakerphone system 46 is shown as having an input path 48 through which a received far-end signal $R_{in}$ is conducted. The input path includes a dynamic highpass filter 50, a receive signal attenuator 52, a digital-to-analog converter 54, an amplifier 56, and a loudspeaker 58. The operations of the attenuator, digital-to-analog converter, amplifier, and loudspeaker may be carried out using conventional hardware and software, since these components are known in the art. Similarly, components which operate in series along an output path 60 of the system may be implemented using hardware and software known in the art. The output path components include a microphone 62, an amplifier 64, an analog-to-digital converter 66, and a send signal attenuator 68. While the invention will be described with reference to a "speakerphone," a telephony connection is not a required element. A "speakerphone" system is defined herein as any speaker/microphone system in which echo is to be suppressed, cancelled, or both.

Figure 4:
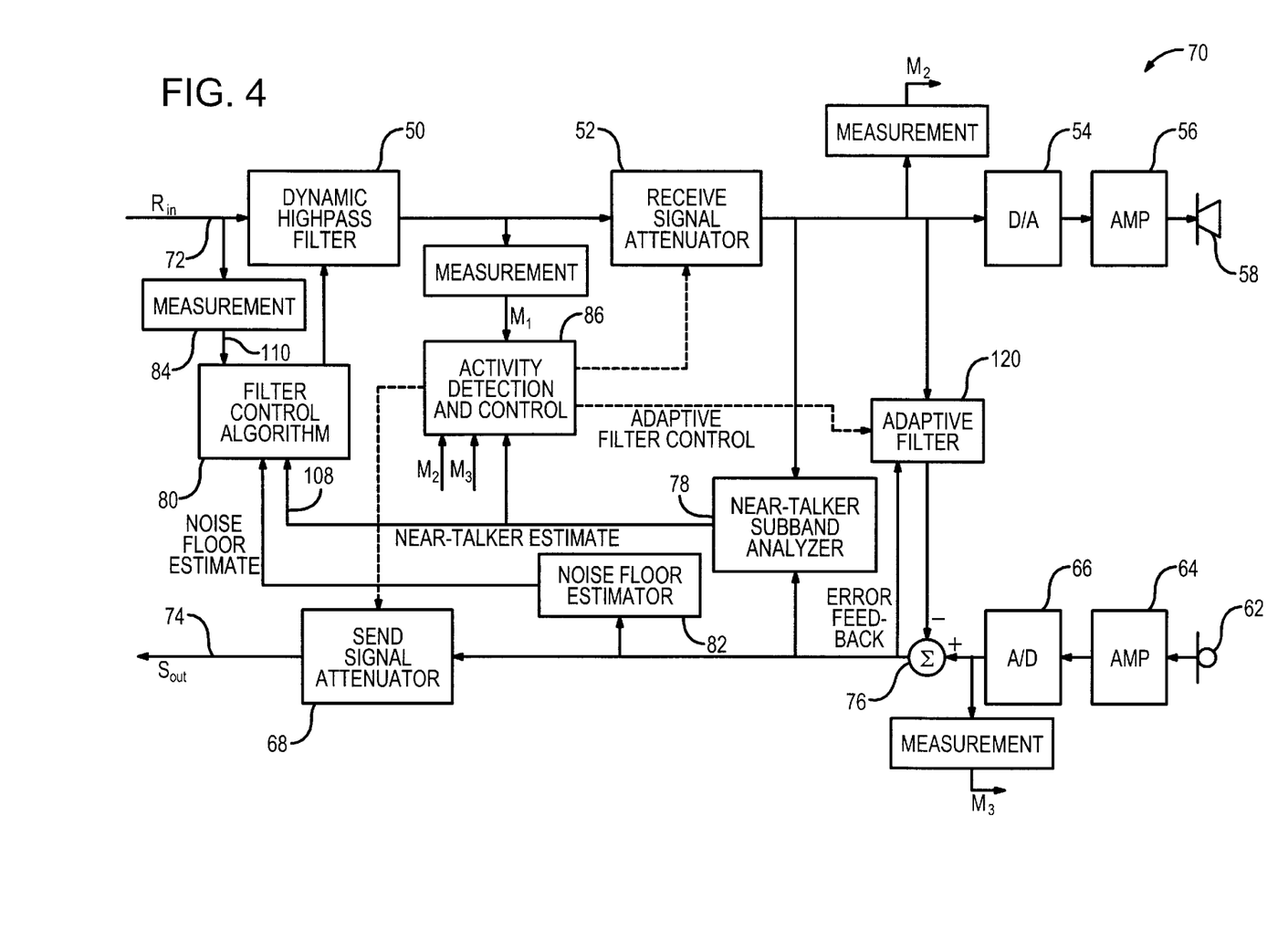
FIG. 4 is a block diagram of an echo cancellation speakerphone system having dynamic highpass filter capability in accordance with a second embodiment of the invention.

The speakerphone system 70 of FIG. 4 includes an input path 72 having the same basic components as the input path 48 of FIG. 3. Therefore, the reference numerals have been duplicated for the input path component. Similarly, the output path 74 of FIG. 4 includes the same components as the output path 60 of FIG. 3, with the exception that the output path 74 has an additional feature, namely a summing component 76 that performs part of the echo cancellation by removing the echo signal from the input signal. From a functional standpoint, the basic difference between the systems of FIGS. 3 and 4 is that the system of FIG. 4 provides both echo cancellation and echo suppression while the system of FIG. 3 only provides echo suppression. Thus, FIG. 3 is an improvement over the system of FIG. 1, while FIG. 4 is an improvement over the system of FIG. 2. The improvements are realized by the addition of four components. The added components are the dynamic highpass filter 50 that has controllable filter characteristics, a near-talker subband analyzer 78, a filter control algorithm component 80, which is used to set the filter characteristics of the dynamic highpass filter, and a noise floor estimator 82. Highpass filter 50 functions as a first echo controller in both FIGS. 3 and 4, performing echo suppression. The second echo controller function is provided by the send signal attenuator 68 in FIG. 3 and the combination of the send signal attenuator 68 and the summing component 76, the addition of the summing component of 76 allowing the performance of echo cancellation.

The near-talker subband analyzer 78 of FIGS. 3 and 4 determines the amount of valid near-talker power present in the signal from the microphone 62. The goal is to separate the microphone signal power into estimates of the undesired echo power and the desired near-talker power. The analyzer 78 has inputs of the reference loudspeaker signal and the microphone signal. The analyzer calculates a prediction of the level of echo that would be present in the microphone signal on the basis of the reference loudspeaker signal and subtracts this power prediction from the total power of the microphone signal in order to determine the amount of non-echo power present in the signal. A more detailed description of the analyzer will follow.

The dynamic highpass filter 50 is a linear filter having substantially flat characteristics for higher frequencies, but having a gradual roll-off for low frequencies. Typically, a filter of this type has a "cutoff" frequency that is defined as the point at which the filter attenuation is 3 dB relative to the flat portion of the frequency response. In general, the cutoff characteristic is controlled upwardly or downwardly by operation of the filter control algorithm component 80.

The filter control algorithm component 80 has inputs from the near-talker subband analyzer 78 and a received signal power measurement from a measurement component 84. As shown in FIGS. 3 and 4, there is also an input from the noise floor estimator 82. Based upon the inputs, the filter control algorithm component sets the characteristics of the dynamic highpass filter 50. In general, the greater the received signal power as measured by the measurement component 84, the higher the cutoff frequency. Similarly, the greater the near-talker activity as determined by the analyzer 78, the higher the setting of the cutoff frequency.

The noise floor estimator 82 is a component which is sometimes used in speakerphone systems having echo suppression. In general, the estimator functions to estimate a consistent noise level, so as to differentiate between valid near-talker activity and simple background noise. For purposes of explanation, the estimator is shown as a component that is separate from the activity detection and control component 86, but they may be considered as a single component.

Firstly, it should be noted that within both the echo suppression approach of FIG. 3 and the echo cancellation approach of FIG. 4, the filter control algorithm component 80 is substantially independent of the conventional activity detection and control component 86. Secondly, prior to providing more detailed descriptions of the filter 50, the analyzer 78, the control algorithm component 80, and the estimator 82, a number of observations and assumptions will be identified. One observation is that practically all loudspeakers have substantially more nonlinear distortion at lower frequencies than at higher frequencies. In generally, the low frequencies require the loudspeaker diaphragm to move with greater amplitude in order to produce the same level of sound as at higher frequencies. The required amplitude is in direct inverse relation to the frequency. Another observation is that speech carries a higher level of intelligibility (i.e., discernability) at frequencies above 1000 Hz. This is a consequence of the fact that consonants and unvoiced speech, in general, carries the information that makes speech distinct. However, on average, ninety percent of speech power is in the frequencies below 1000 Hz. Voiced speech (e.g., vowels) carries less of the intelligible information, but voiced speech is also concentrated much greater toward the lower frequencies. The first fundamental frequencies of human voiced speech are in the range of 125 Hz to 200 Hz, depending substantially on whether the talker is male of female.

Yet another observation is that the low frequency content of speech can mask the high frequency content of another talker. That is, low-frequency concentrated voiced speech of one talker can effectively hide the speech of another talker.

As another observation, the coupling between a loudspeaker and a microphone in most speakerphone systems is greater for low frequencies than for high frequencies. That is, a higher proportion of the echo signal is from the low frequencies. This is a consequence of directionality properties of most loudspeakers, relative to microphones. In some cases, directional microphones are used. Directional microphones also have a general property that lower frequencies are received at a somewhat more omni-directional pattern than the higher frequencies.

To take advantage of these points, the invention of FIGS. 3 and 4 utilizes the dynamically varying highpass filter to (1) reduce the possibility that the loudspeaker will be driven into a nonlinear region, (2) suppress the low frequencies of the received far-end signal $R_{in}$ in order to reduce the total echo signal power, (3) facilitate the detection of a voiced speech near-end talker signal, (4) facilitate determining the composition of the echo-cancelled signal into residual echo and valid near-talker energy components, and (5) use less power while producing an intelligible signal.

Referring again to FIGS. 3 and 4, the dynamic bandpass filter 50 may be implemented in a number of different variations of filter structures, but for simplicity and for the purpose of maintaining a low group delay, a simple Infinite Impulse Response (IIR) filter is beneficial. Preferably, there are less than three poles. It is not desirable to use more poles, since the response may have greater group delay and delay distortion if three or more poles are included.

Figure 5:
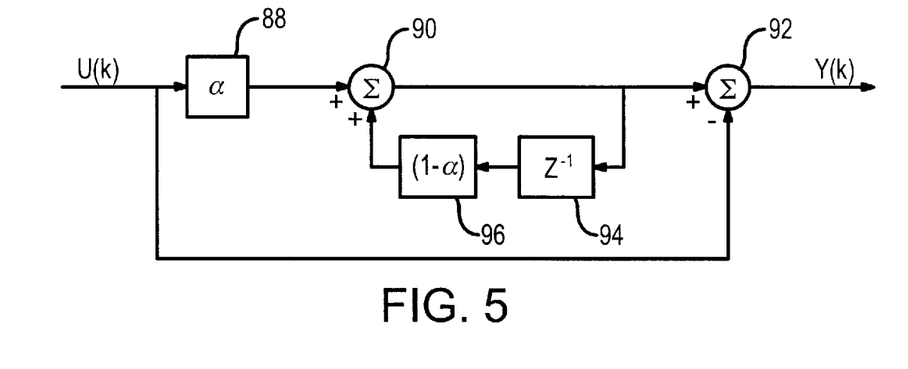
FIG. 5 is a single-pole embodiment for use in the dynamic highpass filter of FIG. 3 or FIG. 4.
Figure 6:
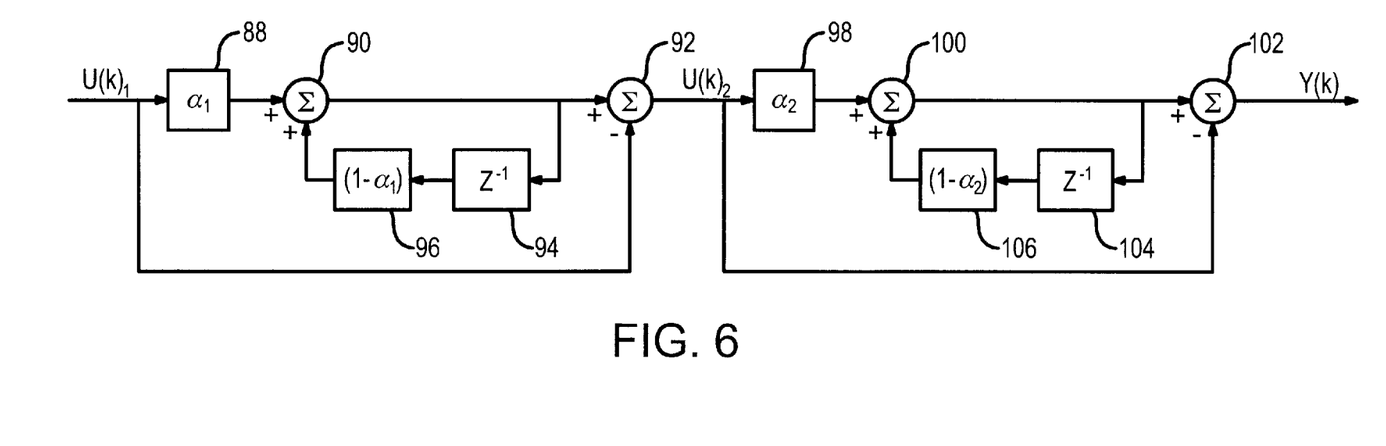
FIG. 6 is a two-pole embodiment for use in the dynamic highpass filter of FIG. 4 or FIG. 5.
Figure 7:
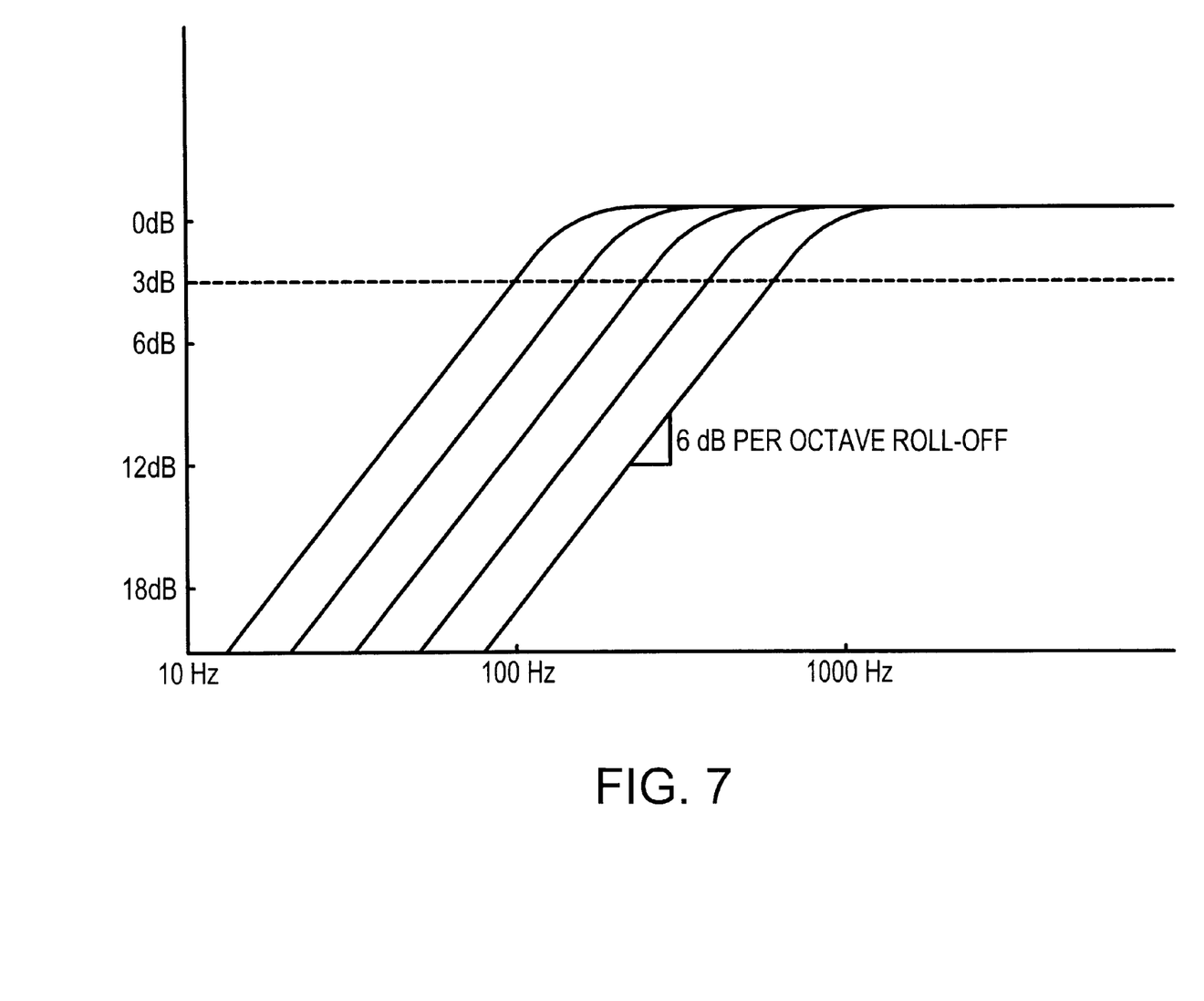
FIG. 7 illustrates the filter characteristics of the single-pole highpass filter structure of FIG. 5.

FIG. 5 illustrates a single-pole highpass filter structure, while FIG. 6 illustrates a two-pole highpass filter structure in which two one-pole structures of FIG. 5 are concatenated together. FIG. 7 shows representative frequency responses for the single-pole filter structure with various cutoff frequencies. In the single stage of FIG. 5 and in both of the stages of FIG. 6, the following applies:

$$X(k)=(1-\alpha)*X(k-1)+\alpha*U(k)$$

$$Y(k)=U(k)-X(k)$$

where $X(k)$ is a single-state variable, $Y(k)$ is the output of the filter stage, $U(k)$ is the input value of the filter stage, and $\alpha$ is the filter coefficient. This is implemented for each first stage of FIGS. 5 and 6 by the filter coefficient 88, a pair of summing devices 90 and 92, and a pair of feedback components 94 and 96. In the second stage of FIG. 6, the same arrangement is provided by a second filter coefficient 98, two summing devices 100 and 102, and feedback components 104 and 106.

The time constant (in terms of samples) is approximately the inverse of $\alpha$. That is, $$TimeConstant(samples)=1.0/\alpha$$

The cutoff frequency is approximately:

$$f_{cutoff}=1/(2*Pi*TimeConstant)$$

where the TimeConstant is expressed in seconds and $f_{cutoff}$ is expressed in Hertz.

This relationship is generally accurate for cutoff frequencies at low frequencies, but the relationship is distorted for higher frequencies. The distortion is due to the warping effect of converting from the continuous filter domain to the sampled-data filter domain.

For a single-pole highpass filter having a 8000 Hz sample rate, the coefficient $\alpha$ approximately relates to the desired cutoff frequency by the following equation:

$$\alpha=0.000824*f_{cutoff}$$

where $\alpha$ is expressed as a floating point coefficient.

The filter characteristic can be changed at any time by simply replacing the current value of $\alpha$ with a new value of $\alpha$. This will instantly change the filter response characteristics.

Figure 8:
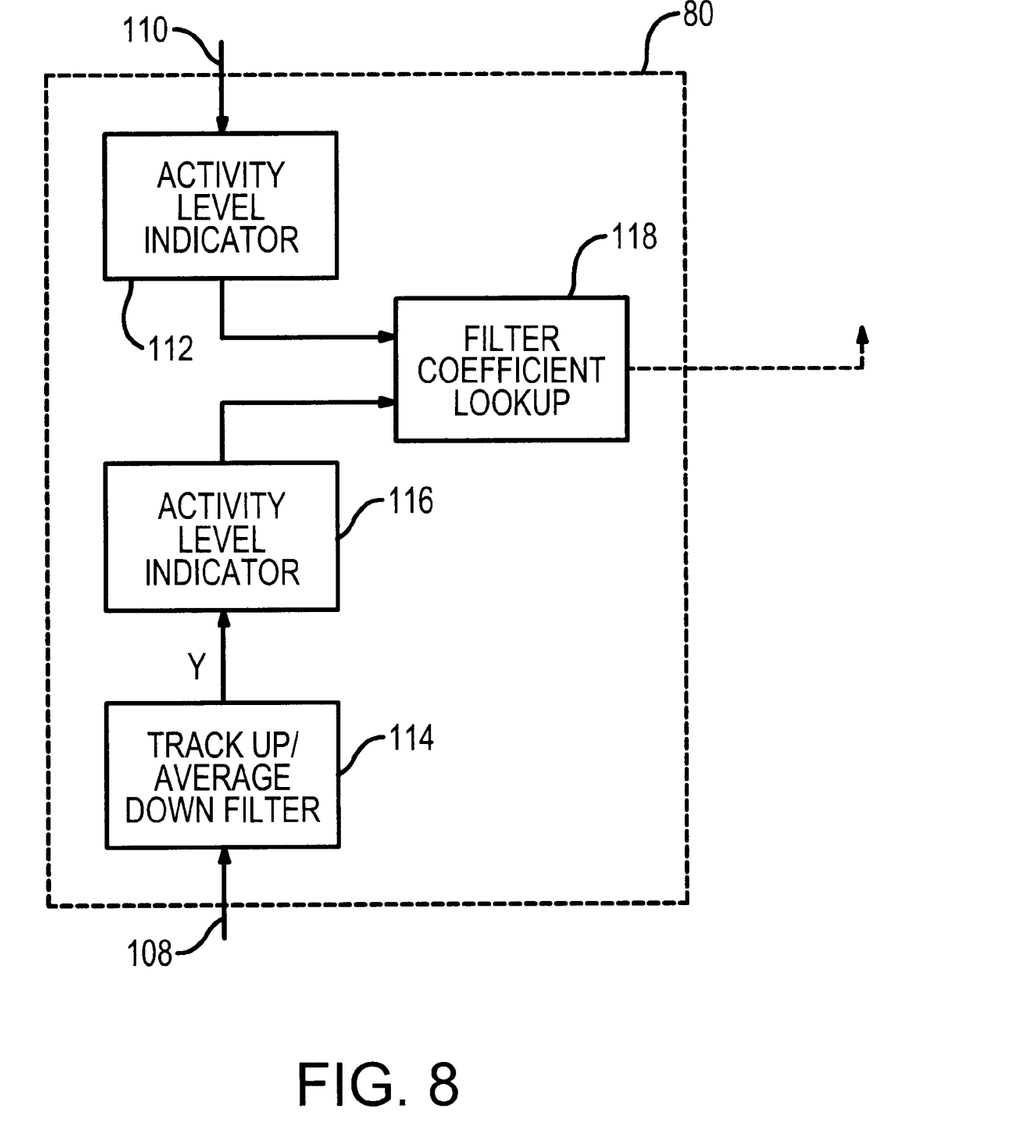
FIG. 8 is a block diagram of one embodiment of a filter control algorithm component for use in FIG. 3 or 4.

Referring now to FIG. 8, one embodiment of a filter control algorithm component 80 for use in either FIG. 3 or FIG. 4 is shown as having two inputs 108 and 110. The input 108 is an estimate of the near-talker signal power, as determined by the near-talker subband analyzer 78. The input 110 is a calculation of the power of the received signal $R_{in}$ by the measurement component 84. In the preferred embodiment, the input 108 filter control algorithm component 80 of FIG. 8 is also responsive to the noise floor estimator, as will be explained below.

As will be appreciated by persons skilled in the art, many of the elements of FIGS. 3, 4 and 8 are implemented in computer software or a combination of software and circuitry hardware. While the algorithm component 80 and the measurement component 84 are shown as separate elements for purposes of explanation, the components may be considered to be a single entity. The measurement of the received signal power is translated by an activity level indicator 112 into a measure of "activity confidence." In one embodiment, the activity confidence measure is defined as having a value in the range of 0 to 1.0.

The estimate of the near-talker power level (N) along input 108 is transformed by a tracking filter 114 into a filter output (Y) that tracks the near-talker power level as it is increasing, but reflects a long term average as the near-talker power level is decreasing. The operations of the tracking filter 114 may be described as follows:

$$Y=N \text{ if } N>Y$$

$$Y=(1-\alpha)*Y+\alpha*N \text{ if } N<Y$$

The tracking filter creates persistence to indicate recent microphone activity. A typical time constant for the tracking filter equation is 250 milliseconds.

The filter output Y is delivered to a second activity level indicator 116. This second indicator 116 maps the "recent" microphone activity power level into a second activity confidence measure, which may again be a value in the range of 0 to 1.0. The two confidence measures from the indicators 112 and 116 are inputs of a filter coefficient lookup stage 118 that maps the two confidence levels to a set of filter coefficients. The selected coefficient is based upon the two confidence values and is passed to the dynamic highpass filter 50 for processing the current $R_{in}$ signal along the input path.

Table 1 is an example of the mapping of measurements of $R_{in}$ signal power to activity confidence levels by the first activity level indicator 112. Table 1 expresses the receive power as a level that corresponds to the equivalent sound pressure.

TABLE 1

| Power level<br>DB sound pressure level | Receive Power Activity<br>Confidence |
|---|---|
| >90 dBspl | 1.0 |
| >84 dBspl | 0.9 |
| >78 dBspl | 0.8 |
| >72 dBspl | 0.7 |
| >66 dBspl | 0.5 |
| >62 dBspl | 0.3 |
| <62 dBspl | 0.0 |

Table 2 represents an example of operations by the second activity level indicator 116. Here, the power level of concern is the level by which the microphone power exceeds the measure of the noise floor by the noise floor estimator 82. Presuming 80 samples at a sample rate of 8000 Hz, the block size would be 10 milliseconds. It is recommended that the near-talker power be filter by the tracking filter 114 of FIG. 8 in order to create persistence for the near-talker activity. A time constant of 250 milliseconds is recommend for this function as a way to indicate persistence between speech utterances. Therefore, the value of $\alpha$ should be 10/250, or 0.04. The filtered power level is compared against the noise floor and is mapped to an activity confidence.

TABLE 2

| Power level above the Sin<br>Noise Floor Measurement | Near-Talker<br>Activity Confidence |
|---|---|
| >18 dB | 1.0 |
| >12 dB | 0.7 |
| >6 dB | 0.4 |
| >0 dB | 0.1 |
| ≦0 dB | 0.0 |

The two activity confidence levels of Tables 1 and 2 are then considered together and are mapped to a filter characteristic having the appropriate cutoff frequency. This can be efficiently achieved by selecting at least one filter coefficient. The filter coefficient mapping is represented in Table 3.

The filter coefficient mapping is highly application-dependent, so that Table 3 is merely an example. For an application that has a severely constrained loudspeaker or for an application having a constrained power budget, a high cutoff frequency should be selected for even low levels of receive signal power. On the other hand, for applications where there are no significant constraints and a powerful adaptive filter 120 (for the embodiment of FIG. 4) is available, only a modest change in cutoff is required. Table 3 represents a general application.

TABLE 3

Cut-off Frequency Selection Table (all frequencies expressed in Hz)

| | | Receive Activity Confidence | | | | | |
|---|---|---|---|---|---|---|---|
| | | 0.1–0.3 | 0.3–0.5 | 0.5–0.7 | <0.1 | 0.7–0.9 | 0.9–1.0 |
| Near | <0.1 | 200 | 250 | 300 | 350 | 400 | 450 |
| Talker | 0.1–0.3 | 250 | 300 | 350 | 400 | 450 | 500 |
| Activity | 0.3–0.5 | 300 | 350 | 400 | 450 | 500 | 550 |
| Con- | 0.5–0.7 | 350 | 400 | 450 | 500 | 550 | 600 |
| fidence | 0.7–0.9 | 400 | 450 | 500 | 550 | 600 | 650 |
| | 0.9–1.0 | 450 | 500 | 550 | 600 | 650 | 700 |

Regardless, it is important that the filter characteristics are not changed too quickly, so as to avoid the introduction of audible artifacts. Therefore, it is preferred that the cutoff frequency selection be limited to a change of 50 Hz per block.

The near-talker subband analyzer 78 of FIGS. 3 and 4 determines the amount of valid near-talker power that is present in the microphone signal by dividing the analysis of the microphone and loudspeaker signals into subbands. This functions to separate the microphone signal power into estimates of the echo power component and the actual near-talker power component. The analyzer 78 requires an input of the reference loudspeaker signal and an input of the microphone signal. The analyzer renders a prediction regarding the level of echo present in the microphone signal given the reference loudspeaker signal and uses this prediction to estimate the amount of non-echo power (valid signal) present in the signal microphone.

Since the lower frequencies have been suppressed by the operations of the dynamic highpass filter 50, it is much more likely that the microphone signal will have little low frequency echo energy, while there may be significant low frequency near-talker energy. With the low frequency portion of the microphone signal less contaminated by low frequency echo, it becomes easier to estimate the actual level of near-talker energy. For example, for the case in which the near-end talker has voiced speech that consists substantially of speech energy of 150 Hz, while the far-end signal is highpass filtered with a cutoff frequency of approximately 900 Hz, there will be little echo content in the range of 150 Hz. By performing subband analysis, a substantial portion of the near-talker energy level will be seen at the low frequency subbands.

Referring to FIG. 4, the input for the near-end talker subband analyzer 78 for the microphone power determination follows the echo cancellation by the adaptive filter 120. Therefore, at least a portion of the echo has been removed from the microphone signal. In FIG. 3, there is no cancellation, so the input signal to the analyzer from the microphone signal path will be different.

In one embodiment, the near-talker subband analyzer includes a subband filter bank which uses a Discrete Fourier Transform (DFT). The DFT might consist of a vast variety (FFT) or one of the other forms of effectively transforming by computing a correlation against orthogonal sine wave components.

It is beneficial to perform a partial DFT to create several subbands in the low frequency range between 0 Hz and 1000 Hz. Prior to performing the DFT, a Hanning window is recommended. The advantage of a Hanning window is that it can be easily implemented in the frequency domain by performing a simple three-point convolution. These techniques are well known to digital signal processing practitioners.

Figure 9:
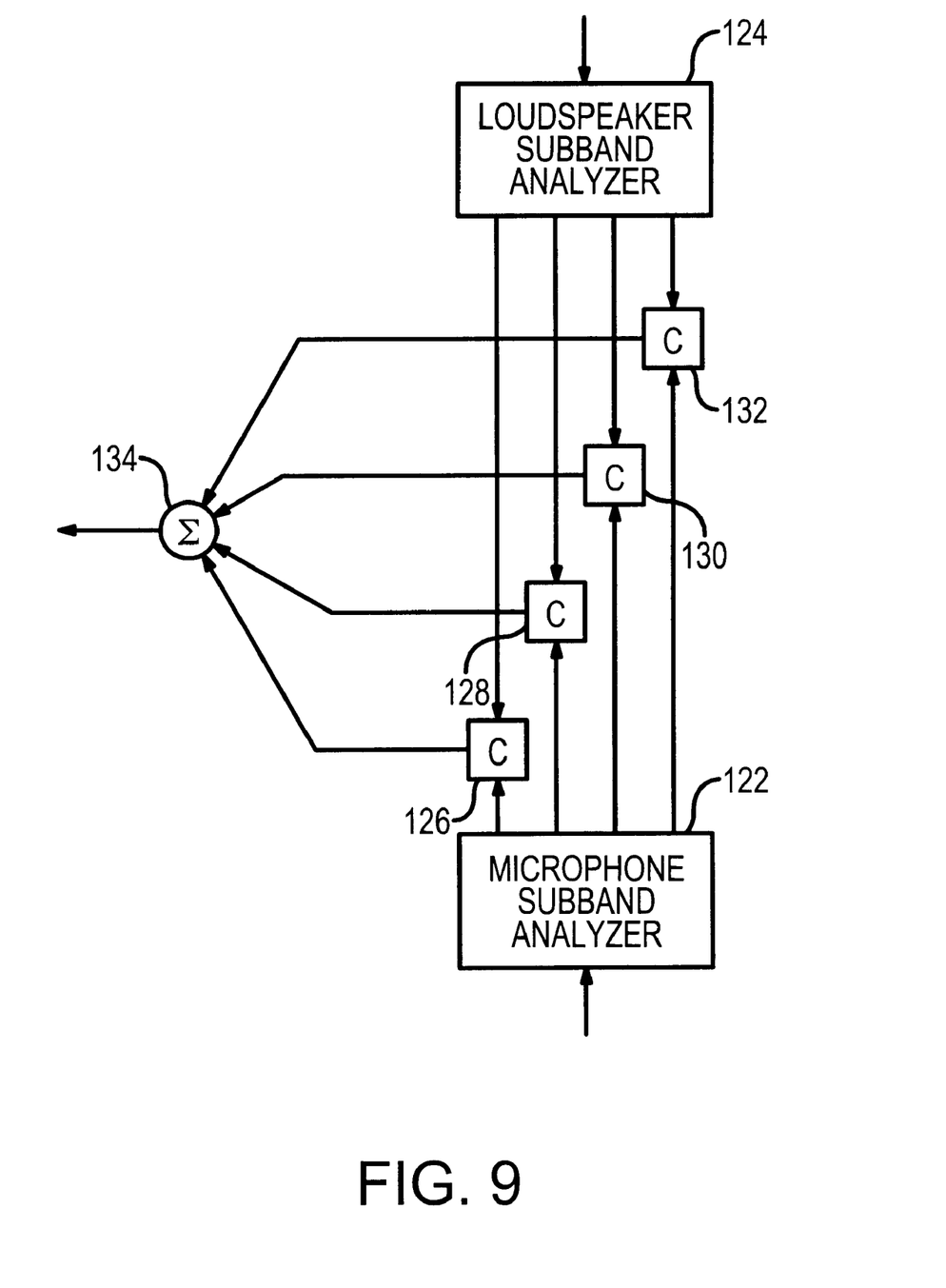
FIG. 9 is a block diagram of one embodiment of a near-talker subband analyzer for use in the systems of FIGS. 3 and 4.
Figure 10:
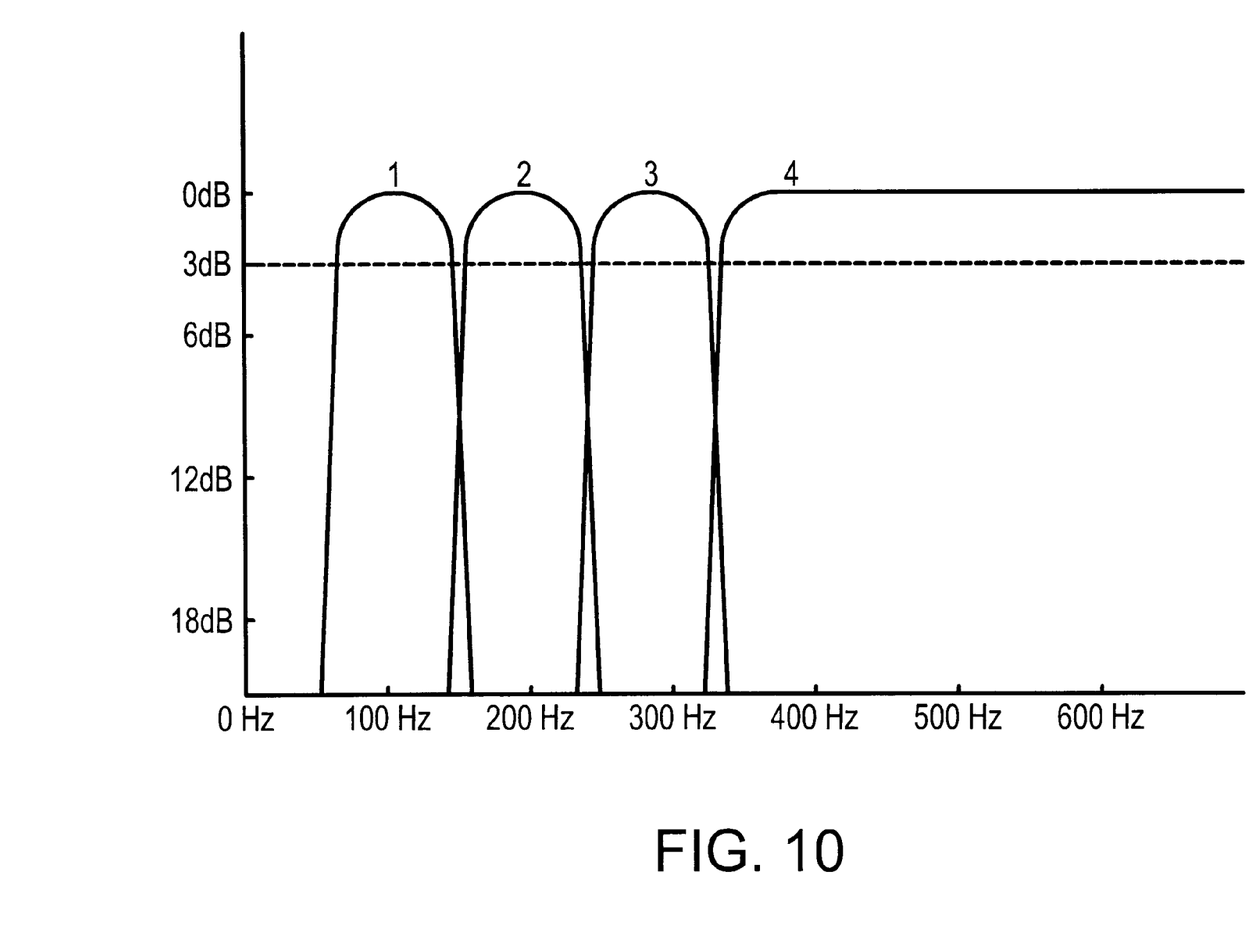
FIG. 10 illustrates an example of a frequency response of the four analysis subbands of FIG. 9.

For illustration purposes, FIG. 9 is an example of a near-talker subband analyzer that considers four low frequency subbands, while FIG. 10 is a graph of the four subbands. A microphone subband analyzer 122 receives an input of the microphone signal in the embodiment of FIG. 3 or an input of the echo-cancelled microphone signal in the embodiment of FIG. 4. A loudspeaker subband analyzer 124 receives a loudspeaker reference signal as its input. Each of four subband comparators 126, 128, 130 and 132 receives the associated subband information from the two analyzers 122 and 124. Each subband comparator runs a comparison of the energy levels to determine the amount of valid near-talker energy at its subband. The comparison operation may be described by the following pseudo C-code equations:

```
{
NearTalkerLevel = SinPower -
    (CouplingGain * EchoCancellerGain * SafetyFactor * RoutPower);
if(NearTalkerLevel < NoiseFloorLevel)
    NearTalkerLevel = NoiseFloorLevel;
}
``` where SinPower is the power of the sampled microphone signal, CouplingGain is the gain between the projected loudspeaker signal to the microphone input signal (i.e., the loudspeaker-to-microphone acoustic coupling), EchoCancellerGain is the gain (typically less than unity) of the insertion of the echo canceller (in the embodiment of FIG. 4), SafetyFactor is a number (generally greater than unity) that prevents an accidental detection of a NearTalker level, and RoutPower is the power level of the loudspeaker reference signal. Each of these components is measured or set for each frequency bin of the spectrum analysis.

It should be noted that the echo power may be so great that the NearTalkerLevel estimate is less than 0. In this case, it is not possible to determine valid near-talker energy. The best that can be known is that the near-talker energy is approximately the same as the noise floor level.

By applying the above-identified pseudo code equation to each of the subbands and using a summing device 134 for the four outputs, the total near-talker energy can be estimated. The energies of all subbands are summed to produce the total near-talker energy estimate, which is provided to the filter control algorithm component 80.

The noise floor estimator 82 generates an estimate for each subband and generates a noise floor estimate for the entire band. There are several known varieties of noise floor estimators. In general, such an estimator has an input of a power level for the current block of samples. The power measurement is filtered to set the noise floor. The recommended filter is described by the following pseudo-code equations:

```
if(InputPower > NoiseFloor)
    NoiseFloor = (1.0 + BetaUp) * NoiseFloor;
else
    NoiseFloor = NoiseFloor -
    BetaDown * (NoiseFloor - InputPower);
``` where InputPower is the measured power of the current sample block, NoiseFloor is the noise floor estimate state, BetaUp is a constant of approximately 0.005 that regulates the upward attack of the noise floor estimate, and BetaDown is a constant that governs the rate of downward attack of the noise floor estimate.

The noise floor estimate of this filter generally increases when the current power level is greater than the noise floor estimate. However, when the input power is less than the noise floor estimate, the estimate will drop rapidly. The estimator 82 is not sensitive to large signal power activity. When there is a large signal, the noise floor only rises by a portion of the BetaUp parameter.

The operations of the systems of FIGS. 3 and 4 will now be considered for different signal activity situations. As a first activity situation, both the near-end activity and the far-end activity may be low. With such a situation, there is only a small amount of consequential action. In this case, the receive power is low, so the receive activity confidence level is low (i.e., near 0). There is no echo and there is no microphone signal activity, so the microphone activity confidence is also low (near 0). Therefore, it will be determined that the dynamic highpass filter 50 should have a relatively low cutoff frequency. In Table 3, a cutoff frequency of 200 Hz would be selected.

As a second possible activity situation to be considered, there is a transition to a high far-end activity, but the near-end activity remains low. As the far-end activity increases, the dynamic highpass filter 50 is gradually changed to adopt a higher cutoff frequency. The filter is not changed at a high rate of speed, but rather is metered at a rate of 50 Hz per block, as was suggested above in order to limit any audible artifacts. The effect of this action is to provide a highly intelligible signal to the loudspeaker 58, but with substantially less power and signal amplitude than would have occurred if there were no highpass filter.

As a third situation to be considered, the far-end activity remains high, but the near-end activity transitions upwardly. If the far-end activity is previously high, the filter cutoff frequency will be near 450 Hz for the current parameters. Two situations may occur. Firstly, the strength of the echo coupling from the loudspeaker 58 to the microphone 62 may be so large that it is not possible to determine the near-end talker signal, even with subband analysis. In this case, the speakerphone system will likely continue to select the far-end as the "winning" talker and the output path 60 in FIG. 3 or 72 in FIG. 4 will likely be suppressed by the attenuator 62 in order to at least reduce the echo. The second possibility is that the dynamic highpass filter 50 will detect the near-talker signal at the frequency bands below 450 Hz. In this case, the intensity of the near-end activity will be detected. If there is sufficient near-end energy to mask the far-end echo, it is possible to transmit the signal with no attenuation, using the near-end talker signal to mask the echo. Returning to the first of the two possibilities, there will be no substantial modification to the frequency cutoff of the dynamic highpass filter. On the other hand, for the second possibility, the dynamic highpass filter cutoff will be pushed even higher, facilitating the detection of the near-end talker.

The next of the possible activity situations to be considered is the one in which the far-end activity transitions back downwardly, while the near-end activity remains high. While the far-end activity subsides, it will be easier for the subband analysis to accurately detect the valid near-end activity. This will have the effect of maintaining the selected cutoff frequency. If the subband analysis had failed previously, it will now be able to detect the near-end talker energy, so that the cutoff frequency will remain high.

As the final activity situation to be considered, the far-end activity again transitions upwardly, while the near-end activity remains high. Because the near-end activity is high, the filter cutoff frequency is already set at 450 Hz. Consequently, the change in the far-end activity will have the effect of pushing the cutoff frequency even higher. The near-end activity has already been sensed and is locked by the tracking filter 114 within the filter control algorithm component 80 of FIG. 8, so that the cutoff frequency will remain high even if the far-end activity level is very high. The speakerphone algorithm can determine which activity level is truly higher and can decide if either side needs to be attenuated. When the near-end activity is sufficient to mask the far-end echo, the speakerphone algorithm may elect to not suppress the output path.

What is claimed is:

1. A speakerphone system comprising:
    an input signal path having a receive end connected to receive a far-talker signal and having a speaker end connected to a first transducer for generating an audible output in response to said far-talker signal;
    an output signal path having a microphone end connected to a second transducer for generating a near-talker signal, said output signal path having a transmission end connected to transmit said near-talker signal to a source of said far-talker signal;
    a first echo controller positioned along said input signal path, said first echo controller being configured to manage said level of said acoustic echo component of said near-talker signal, said first echo controller having dynamic filter characteristics that are preferential to passing high frequency components of said far-talker signal and that are dynamically selected on a basis of inhibiting said coupling of said audible output from said first transducer to said second transducer, said first echo controller being configured to manage variations in filtering different frequencies based on likelihoods of said different frequencies to induce said coupling; and
    a second echo controller positioned along said output signal path, said second echo controller being configured to manage a level of an acoustic echo component of said near-talker signal transmitted to said source, where said acoustic echo component is a consequence of coupling of said audible output of said first transducer to said second transducer.

2. The speakerphone system of claim 1 wherein said first echo controller includes a dynamic highpass filter having an adjustable cutoff frequency at a low frequency band of the audio frequency spectrum, wherein selection of said cutoff frequency establishes said filter characteristics of said first echo controller at said low frequency band.

3. The speakerphone system of claim 2 wherein said first echo controller further includes a filter control component configured to select said cutoff frequency based upon both a recent strength of said far-talker signal and a recent strength of said near-talker signal.

4. The speakerphone system of claim 3 wherein said filter control component is configured to increase said cutoff frequency in response to detecting an increase in one or both of said recent strengths, thereby increasing attenuation of said far-talker signal within said low frequency band, said filter control component further being configured to select a low cutoff frequency when both of said signal strengths are low.

5. The speakerphone system of claim 3 wherein said first echo controller further comprises a near-talker subband analyzer having inputs from said input and output signal paths and having an output connected to said filter control component, said near-talker subband analyzer being configured to compare said recent strengths at each of a plurality of audio frequency subbands, said filter control component being responsive to said output of said near-talker subband analyzer to calculate a prediction of a level of said coupling of said audible output to said second transducer.

6. The speakerphone system of claim 5 further comprising a noise floor estimator configured to monitor said near-talker signal and to calculate a recent lower limit of said near-talker signal that is attributable to noise detected by said second transducer, said filter control component being responsive to said output of said near-talker subband analyzer and to said noise floor estimator in calculating said prediction of said level of said coupling.

7. The speakerphone system of claim 1 wherein said second echo controller includes at least one of an echo suppressor and an echo canceller, said first and second echo controllers operating substantially independently.

8. A speakerphone system comprising:
an input signal path connected to conduct a far-talker signal to a loudspeaker;
an output signal path connected to conduct a near-talker signal from a microphone to a transmitter, said output signal path including components that provide at least one of echo suppression and echo cancellation for said near-talker signal;
a dynamic highpass filter positioned along said input signal path, said dynamic highpass filter having adjustable signal attenuation characteristics for low audio frequencies of said far-talker signal; and
an analyzer having inputs from said input and output signal paths for determining an analyzer output that is responsive to a signal component of said near-talker signal that is acoustic echo, said dynamic highpass filter being operatively associated with said analyzer such that said signal attenuation characteristics of said dynamic highpass filter are responsive to said analyzer output in a manner to process said far-talker signal to inhibit said acoustic echo in said near-talker signal.

9. The speakerphone system of claim 8 further comprising a filter control algorithm component configured to select said signal attenuation characteristics of said dynamic highpass filter on a basis of both a measure of power of said far-talker signal and said analyzer output.

10. The speakerphone system of claim 9 further comprising a noise floor estimator connected and configured to monitor levels of background noise within said near-talker signal, said selection of said signal attenuation characteristics by said filter control algorithm component being further responsive to a recent determination of said level of background noise.

11. The speakerphone system of claim 8 wherein said dynamic highpass filter has generally linear bandpass filter characteristics at high audio frequencies of said far-talker signal and has a roll-off of bandpass filter characteristics at said low audio frequencies, said adjustable signal attenuation characteristics of said dynamic highpass filter being specific to properties of said roll-off.

12. The speakerphone system of claim 11 wherein generally linear bandpass filter characteristics of said dynamic highpass filter extend substantially to said roll-off, where said roll-off is adjustable.

13. The speakerphone system of claim 8 wherein said dynamic highpass filter is an Infinite Impulse Response (IIR) filter having a maximum of two poles.

14. The speakerphone system of claim 8 wherein said analyzer is configured for frequency subband analysis of said near-talker signal as compared to said far-talker signal.

15. A method of controlling echo comprising the steps of:
receiving a far-talker signal from a remote site;
dynamically filtering said far-talker signal in a manner preferential to passing high frequency components, including enabling variations in attenuation of low frequency components of said far-taker signal;
generating an audible output of said preferentially filtered far-talker signal at a local site;
forming a near-talker signal by detecting sounds at said local site, said near-talker signal having an acoustic echo component that occurs in response to said audible output and having a signal component that occurs in response to talking at said local site;
removing at least a portion of said acoustic echo component from said near-talker signal prior to transmitting said near-talker signal to said remote site; and
selecting filtering characteristics for attenuating said low frequency components of said far-talker signal based upon controlling a level of said acoustic echo component within said near-talker signal.

16. The method of claim 15 wherein said selecting step includes determining a cutoff frequency for a roll-off of preferential signal passage, where said cutoff frequency is adjustable.

17. The method of claim 16 wherein said selecting step includes selecting said cutoff frequency within a range of 20 Hz to 1000 Hz.

18. The method of claim 15 wherein said selecting step is based upon each of a power level of said far-talker signal and a calculation of said level of said acoustic echo component within said near-talker signal.

19. The method of claim 18 further comprising calculating said level of said acoustic echo component by comparing said far-talker signal to said near-talker signal, including providing frequency subband analysis.

20. The method of claim 19 wherein said selecting step further includes monitoring background noise at said local site and offsetting a level of said background noise in said determining said level of said acoustic echo component.

* * * * *

UNITED STATES PATENT AND TRADEMARK OFFICE
CERTIFICATE OF CORRECTION

PATENT NO.         : 6,785,382 B2
APPLICATION NO. : 10/044658
DATED              : August 31, 2004
INVENTOR(S)        : McLaughlin et al.

It is certified that error appears in the above-identified patent and that said Letters Patent is hereby corrected as shown below:

At column 4, line 47, please replace "Fig. 3 or 4" with --Figs. 3 or 4--
At column 5, line 18, please replace "suppression, while" with --suppression while--
At column 5, line 25, please replace "80, which" with --80 which--
At column 9, line 12, please replace "change in cutoff" with --change is cutoff--
At column 9, lines 46 and 47, please replace "it is much more likely" with --there is a higher likelihood--
At column 9, line 50, please replace "near-talker energy. For example" with --near-talker using this likelihood. For example--

Signed and Sealed this

Sixth Day of November, 2007

JON W. DUDAS
*Director of the United States Patent and Trademark Office*